United States Patent [19]

McPherson et al.

[11] 4,243,075
[45] Jan. 6, 1981

[54] COMPOSITE PIPE

[75] Inventors: Alex L. McPherson, Winfield, Ill.; Douglas E. Triestram; James E. Lawrence, Jr., both of Coshocton, Ohio

[73] Assignee: Clow Corporation, Oak Brook, Ill.

[21] Appl. No.: 8,471

[22] Filed: Feb. 2, 1979

Related U.S. Application Data

[63] Continuation-in-part of Ser. No. 879,112, Feb. 21, 1978, abandoned.

[51] Int. Cl.³ ............................................... F16L 9/04
[52] U.S. Cl. ..................................... 138/174; 138/132; 138/133; 138/153; 138/124; 138/125
[58] Field of Search ............... 138/125, 126, 130, 132, 138/137, 140, 144, 153, 172, 174, 175, 124

[56] References Cited

U.S. PATENT DOCUMENTS

| | | | |
|---|---|---|---|
| 2,614,058 | 10/1952 | Francis | 138/141 X |
| 2,925,831 | 2/1960 | Welty et al. | 138/174 |
| 3,177,902 | 4/1965 | Rubenstein | 138/176 |
| 3,406,724 | 10/1968 | Carlstrom et al. | 138/137 |
| 3,483,896 | 12/1969 | Grosh | 138/153 X |
| 3,630,237 | 12/1971 | Varnell et al. | 138/176 |
| 3,676,246 | 7/1972 | Grosh | 138/144 X |
| 3,871,409 | 3/1975 | Gilbu | 138/174 |
| 3,884,269 | 5/1975 | Schetty et al. | 138/137 |
| 3,893,488 | 7/1975 | Rogers et al. | 138/141 |
| 3,953,629 | 4/1976 | Wesch | 138/141 X |

*Primary Examiner*—James E. Bryant, III
*Attorney, Agent, or Firm*—Fitch, Even, Tabin, Flannery & Welsh

[57] ABSTRACT

A composite reinforced plastic pipe and method of making the same are disclosed wherein a resin impregnated surfacing mat is formed into a tubular inner liner on a mandrel or the like, a plurality of resin impregnated continuous fiberglass strands are helically wound upon the inner liner to form an inner layer, a sand-resin composition is applied onto the inner layer to form a tubular core, and an outer layer of resin impregnated continuous fiberglass strands are helically wound upon the tubular core whereafter the composite pipe is cured to provide a pipe having high resistance to internal and external pressures.

5 Claims, 2 Drawing Figures

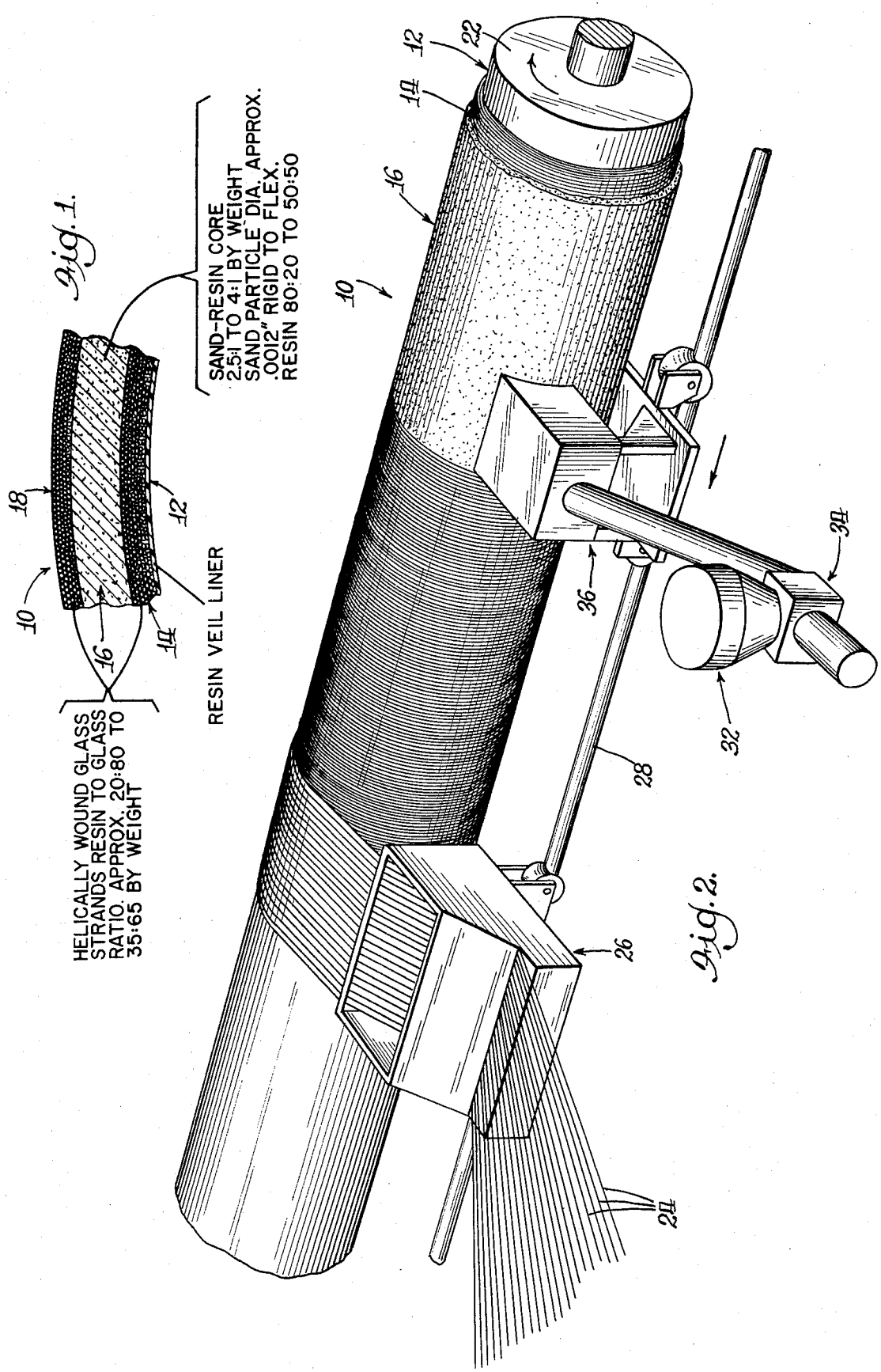

COMPOSITE PIPE

The present application is a continuation-in-part from copending application, Ser. No. 879,112, filed Feb. 21, 1978, now abandoned and relates generally to tubular pipe such as used in pressure water, sewer systems and the like, and more particularly to novel composite reinforced plastic pipe wherein the pipe has improved high resistance to internal and external pressures.

It is known to make reinforced plastic pipe by continually winding suitable filamentary material about a mandrel to form a cylindrical tube, the filaments being impregnated with a curable resinous material either before application to the mandrel or during application to the mandrel, followed by curing of the wound filaments and removal of the mandrel. The filamentary material and curable resinous material generally comprise continuous glass fiber filaments and a suitable epoxy or polyester resin. When cured, the resulting pipe structure is relatively strong and corrosion resistant.

Reinforced plastic pipe of the aforenoted type is generally capable of withstanding substantial internal pressure due to the relatively high strength of the continuous glass fiber filaments. In underground applications requiring relatively large diameter pipe, such as in underground water or sewer lines, the wall thickness of the pipe necessary to withstand substantial external pressure loads due to ground loading must be greater than would normally be necessary to withstand only the internal pressures encountered. Because the cost of raw materials used in the manufacture of reinforced plastic pipe capable of withstanding a given external pressure load is greater than the cost of competing materials such as reinforced concrete or steel, the latter materials are generally used in large diameter pipe applications even though the reinforced plastic pipe has superior physical and chemical properties. By "larger diameter" pipe is meant pipe having nominal internal diameters in the range of about 15 to 144 inches.

In order to overcome the need for relatively thick walls in reinforced plastic pipe to withstand the external pressures encountered in underground lines, reinforced plastic pipe having a sandwich construction has been introduced. Typically, these structures comprise a thin layer of plastic resin reinforced continuous glass filaments which are wound to provide an inner layer capable of withstanding the normal internal pressures which will be encountered by the pipe. The inner layer is then surrounded by an annular mass of core material capable of withstanding external compressive pressures. A major drawback frequently encountered with known reinforced plastic sandwich type pipe is that water migration can take place in the core with resulting breakdown of the core strength. Additionally, when composite pipe of known construction is subjected to external loads, deformation of the circular cross section is resisted by shear loads at the interface between the core material and the reinforced plastic inner layer, and failure often occurs at the bond between the core and inner layer.

A more recent advance in composite reinforced plastic pipe has been the use of a sand-resin composition for the core layer. The sand-resin composition is believed to enhance the bond between the core and the inner layer which is formed of reinforced plastic. See, for example, U.S. Pat. No. 3,483,896, dated Dec. 16, 1969.

One of the primary objects of the present invention is to provide an improved composite reinforced plastic pipe wherein the pipe is lightweight, resistant to chemical attack, capable of withstanding substantial internal and external pressures without failure, and employs a core highly resistant to water migration.

Another object of the present invention is to provide a composite plastic pipe wherein the pipe employs a novel sand-resin core layer which forms an improved bond between the core and inner and outer plastic reinforced layers.

Still another object of the present invention is to provide a composite reinforced plastic pipe as described which includes an inner liner of resin impregnated veil and/or mat which when cured forms a reinforced plastic liner enhancing the corrosion resistant characteristics of the composite pipe.

Further objects and advantages of the present invention, together with the organization and manner of operation thereof, will become apparent from the following detailed description of the invention when taken in conjunction with the accompanying drawing wherein:

FIG. 1 is a fragmentary segment of a transverse section of a composite reinforced plastic pipe constructed in accordance with the present invention; and FIG. 2 is a schematic diagram illustrating apparatus for helically winding layers of resin impregnated continuous strands in sandwich fashion with an applied sand-resin core.

Referring now to the drawing, and in particular to FIG. 1, a fragmentary transverse segment of a composite reinforced plastic pipe constructed in accordance with the present invention is indicated generally at 10. The composite pipe 10 includes a corrosion resistant inner liner, indicated generally at 12, a primary structural member in the form of an inner layer, indicated generally at 14, a stiffening core layer, indicated generally at 16, and a secondary structural member in the form of an outer layer or skin, indicated generally at 18.

The inner liner 12 is made from veil impregnated with a suitable, curable, resinous material such as thermosetting epoxies or polyesters. The impregnated veil may alternatively be termed a surfacing veil or mat which, in the illustrated embodiment, is formed into a cylindrical tubular inner liner by wrapping or winding the resin impregnated surfacing mat circumferentially around a mandrel or other suitable support, such as indicated at 22 in FIG. 2. The surfacing mat and/or veil is preferably wetted with an isophthalic polyester resin after wrapping it about the mandrel 22 to form the tubular inner liner 12. The resulting resin impregnated surfacing mat liner preferably includes a ratio of resin to glass fibers of approximately 90% resin to 10% glass fibers, the exact ratio of resin, up to 95% resin, to glass fibers for the liner 12 being in part established by the desired corrosion resistance of the final composite pipe. The inner liner 12 improves the corrosion resistance of the pipe 10.

After forming the cylindrical tubular liner 12, the inner layer 14 is formed circumferentially about the inner liner 12 in contact therewith. The inner layer 14 is formed by winding a plurality of continuous glass fiber strands 24 helically along the length of the inner liner 12 and associated mandrel 22 so as to form a plurality of coaxial layers. The continuous glass fiber strands 24, which may alternatively be termed fiberglass strands, are drawn in parallel relation through a suitable resin bath on a winder carriage, indicated generally at 26, in which the strands are wetted by a suitable resin such as isophthalic polyester resin. The resin bath and winder carriage 26 are movable along a guide track or rail 28 by means (not shown) which coordinates movement of the bath and winder with rotation of the mandrel 22 so that as the mandrel rotates, the continuous resin impregnated glass fiber strands 24 are drawn to the mandrel and wound helically along the inner liner 12 in a prescribed pattern. It will be understood that the wetted fiber strands 24 are first tied or otherwise secured about the inner liner and support mandrel to initiate the winding process.

The resin impregnated glass fiber strands 24 are closely spaced so as to form a "sheet" of strands which are preferably laid at a predetermined angle relative to the axis of the mandrel 22, such as, for example, 81½ degrees. In making a composite pipe having a nominal inner diameter of 24 inches, three layers of the resin impregnated glass fiber strands 24 are preferably laid in successive superimposed concentric relation on the inner liner 12 to form the inner layer 14. A combination of wind angles are preferably used within the inner layer 14 to generate the amount of beam strength and hoop strength required of the structure. The spacing between successive helical windings of the strands 24 for a given layer may vary in relation to the tensile strength of the glass fiber strands. For example, it has been found that spacing successively wound strands 24 to provide approximately 10 strands per linear inch along the length of the pipe results in satisfactory coverage of the outer cylindrical surface of the inner liner 12 when forming the inner layer 14. The number of concentric helically wound layers of glass strands 24 required to provide a desired strength pipe is dependent on the density of resin, the tensile strength of the glass strands and the glass to resin ratio. In the case of pipe having a nominal inner diameter of approximately 36 inches, it has been found desirable that for a 250 psia internal pressure rating the inner layer 14 comprise four concentric layers of impregnated glass fibers 24, each layer of which has a radial thickness substantially equal to the diameter of a continuous glass fiber strand 24. For a 36 inch diameter 200 psia rated pipe, three concentric layers of fiber glass may suffice. In general, the lower the internal pressure rating required, the fewer the number of concentric glass fiber strand layers required in the inner layer 14.

After forming the inner layer 14, the core 16 is formed circumferentially upon the inner layer 14. The core 16 comprises a sand-resin composition having a sand to resin ratio in the range of approximately 2.5:1 to 4:1 by weight. The resin, in turn, comprises a mixture of non-flexible or rigid resin to flexible resin in the range of approximately 80:20 to 50:50 so as to provide approximately 4-9 percent elongation, as rated in accordance with ASTM method D638-76 *"Tensile Properties of Plastic."* The core resin preferably has a viscosity in the range of 650-950 centipoises, as rated in accordance with ASTM D-1824.

The sand used in the sand-resin composition of the core 16 is substantially pure silica having a purity of approximately 93% or better. The sand is preferably homogeneous in particle size distribution throughout the core 16 and has an average particle diameter of 0.0112 inch (0.0285 cm.). By providing homogeneous particle size distribution, uniform strength throughout the core after cure is achieved. In the preferred embodiment, the sand may be selected so as to fall within the range of sand particle size set forth in the following table:

| Sieve Size U.S. No. | Percentage Retained | Sieve Opening |
|---|---|---|
| 30 | 0.0 | 0.23" |
| 40 | 1–5 | .0165" |
| 50 | 20–35 | .0117" |
| 70 | 30–50 | .0083" |
| 100 | 11–15 | .0059" |
| pan | 0–2 | |

In accordance with an important feature of the invention, the radial thickness of the core layer 16 is approximately 40-60 percent of the total radial wall thickness of the finished composite pipe 10. The resin employed in the sand-resin material comprising the core 16 may comprise any suitable polyester resin such as isophthalic polyester resin as available from Owens-Corning Fiberglass Corporation. The sand-resin composition is mixed so that the resin uniformly wets the sand so as to prevent dry spots which may cause delamination of the resulting pipe. The sand is uniformly wetted by the resin before the mixture is applied circumferentially on the inner layer 14.

The core application apparatus shown in FIG. 2 in a system comprised of three basic components. The first, a mixer of known design indicated generally at 32, is adapted to provide uniform mixing of the formulated sand-resin core material to form a slurry, The second, a pump indicated generally at 34, is of known design and is provided to transfer the core material slurry at a desired constant rate. The pump 34 is adapted to discharge the core material at positive pressure of not less than 40 psi. The third component comprises and extrusion head, indicated generally at 36, adapted to receive the core slurry from the pump 34 and deposit the core material onto the underlying inner layer 14 of resin impregnated continuous fiber glass strands which have previously been wound on the inner veil liner 12. The extrusion head 36 controls the width of the extrusion of core material onto the inner layer 14. Means (not shown) of conventional design are provided to control the ratio of movement between the mandrel 22 and the extrusion head 36. The extrusion head 36 moves at a constant rate, one width per mandrel revolution. The layer of core material discharged from the extruder head 36 is sheared away from the bulk of the core material in the head as the mandrel 22 is rotated. A blade (not shown) at the exit of the extrusion head 36, along with the material flow rate, controls the thickness of the core material deposited and formed on the inner layer 14.

In the preferred embodiment, the core layer 16 is formed to a radial thickness of approximately 0.44 inch for a 36 inch diameter pipe having a total wall thickness of approximately 0.75 inch.

After forming the core 16 on the inner layer 14, the outer layer 18 is formed circumferentially about and contiguous to the core 16. The outer layer 18 comprises a plurality of helically wound continuous glass fiber strands which are impregnated with a suitable resin material in a manner similar to the fiber strands of the inner layer 14. To this end, the glass fiber strands forming the outer layer 18 are passed through the resin bath 26 to wet the glass fibers with the resin material, and are then helically wound on the core layer 16 at helical angles, such as approximately 81½° to the axis of the mandrel, to impart the desired strength to the composite pipe being formed. As aforenoted, in making a composite pipe having a nominal inner diameter of 24 inches, the inner layer 14 preferably comprises three layers of resin impregnated glass fiber strands 24. For this same nominal pipe size, the corresponding outer layer 18 preferably comprises two concentric layers of resin impregnated glass fiber strands. In forming a composite pipe having a 36 inch nominal diameter and a 250 psia rating, the inner layer 14 preferably comprises four concentric layers of resin impregnated continuous glass fibers, and the outer layer 18 preferably comprises three concentric glass fiber layers.

The continuous resin impregnated glass fiber strands 24 forming both the inner and outer layers 14 and 18 preferably have a resin to glass ratio by weight in the range of approximately about 20:80 to 35:65.

In selecting a resin for use in forming the inner layer 14, the core layer 16 and the outer layer 18, the following compositions and their preferred percentage ratios have been found satisfactory.

|  | INNER LAYER % | CORE LAYER % | OUTER LAYER % |
| --- | --- | --- | --- |
| Rigid Resin | 90 | 60 | 80 |
| Flex. Resin | 10 | 40 | 20 |
| Promoter | .2 | .2 | .2 |
| Inhibitor | .01 | .01 | .01 |
| Antifoam | .001 | .001 | .001 |
| Pigment | — | — | 1.0 |
| Peroxide | .8 | .8 | .8 |
| Thickeners | — | 1.75 | — |
| Total Monomer | 50 | 40 | 50 |
| Tensile Elongation | 2% | 5% | 2.5% |

"Resin" may be Bisphenol "A" Mod., Vinylester, Isophthalic Polyester, Orthophalic Polyester, etc. (Iso-Poly preferred).
Promoter -- Metal Salts such as, but not limited to, Cobalt Naphthenate, Manganese Naphthanate, etc. (Cobalt Naphthenate a preferred promoter).
Inhibitor -- Quaternary Ammonium Salts, such as, but not limited to, Hydroquinone, Tert-butyl Hydroquinone, Tert-butyl Pyrocatechol, etc. (T-butylHydroquinone preferred).
Antifoam -- Silicone Fluids, etc. (Silicone preferred).
Pigments -- Carbon Black, Titanium Dioxide, etc. (Carbon Black preferred).
Peroxide -- Benzoyl Peroxide, Methyl Ethyl Ketone Peroxide, etc. (MEK-Peroxide preferred).
Thickeners -- Cabosil or such.

The compositions may also contain other additives or fillers as desired.

After forming the inner liner 12, inner layer 14, core layer 16 and outer layer 18 as aforedescribed, the composite tube structure is cured at a temperature in the range of approximately 140°-200° F. for approximately 20 minutes to fully cure the resinous material throughout the various wound layers and core layer and polymerize the resins into a cross-linked, solid, three dimensional network. Normally the composite pipe would be heated for 10 minutes at 150° F. to gel the pipe, and then post cured for 10 minutes at approximately 200° F. It will be understood that the curing temperature and curing time may be varied in accordance with conventional techniques.

The composite pipe thus formed provides a lightweight, economical composite pipe having high resistance to chemical attack as well as high resistance to both internal and external pressures. The inner layer 12, termed the surfacing veil or mat contributes to the corrosion resistance properties of the resulting composite pipe, while the sand-resin core 16 provides desired resistance to water migration, and improves pipe stiffness.

The end portion of the pipe may be squared by cutting to remove any irregularities in the end caused by reversal of carriage, or the ends of the pipe may be formed against flat stops to eliminate the need for trimming.

While a preferred embodiment of a composite reinforced plastic pipe in accordance with the present invention and a preferred method of making same has been illustrated and described, it will be understood by those skilled in the art that changes and modifications may be made therein without departing from the invention in its broader aspects. Various features of the invention are defined in the following claims.

What is claimed is:

1. A composite reinforced plastic pipe which includes a tubular inner liner of resin impregnated surfacing veil and/or mat, an inner layer of continuous resin impregnated fiberglass strands wound circumferentially in a helical manner about said inner liner in contact with the outer peripheral surface of said inner liner, a core layer disposed circumferentially about said inner layer in full surface engagement therewith, said core layer consisting of a homogenous particle size sand-resin composition having a sand-resin ratio in the range of approximately 2.5:1 to 4:1 by weight, and an outer layer of continuous resin impregnated fiberglass strands wound circumferentially in a helical manner about said core layer, said inner and outer resin impregnated continuous fiberglass strands having a resin to glass ratio in the range of approximately 20:80 to 35:65 by weight, said sand-resin composition comprising a mixture of rigid resin to flexible resin in the range of approximately 80:20 to 50:50 so as to enable approximately 4–9 percent resin elongation, said inner liner, inner layer, core layer and outer layer being cured to form a composite plastic pipe having high resistance to internal and external pressures.

2. A composite reinforced plastic pipe as defined in claim 1 wherein said sand-resin composition of said core layer includes substantially pure silica.

3. A composite reinforced plastic pipe as defined in claim 2 wherein said sand has an average particle diameter of approximately 0.0012 inch (0.0285 cm).

4. A composite reinforced plastic pipe as defined in claim 1 wherein for a nominal inner diameter pipe of approximately 24 inches, said inner layer comprises at least three concentric coaxial windings of said resin impregnated fiberglass strands, wound in successive concentric overlying layers, and wherein said outer layer comprises at least two concentric coaxial windings of fiberglass strands.

5. A composite reinforced plastic pipe as defined in claim 1 wherein said core layer has a radial thickness equal to approximately 40–60 percent of the total radial wall thickness of the finished pipe.

* * * * *

UNITED STATES PATENT AND TRADEMARK OFFICE
CERTIFICATE OF CORRECTION

PATENT NO. : 4,243,075
DATED : January 6, 1981
INVENTOR(S) : Alex L. McPherson, Douglas E. Triestram, James E. Lawrence, Jr.

It is certified that error appears in the above—identified patent and that said Letters Patent is hereby corrected as shown below:

Column 4, line 6 (in the Table), "0.23" should be --.023--.

Column 4, line 27, second occurence of "in" should be --is--.

Column 4, line 36, "and" should be --an--.

Column 6, line 1, "layer" should be --liner--.

Signed and Sealed this

Fourth Day of August 1981

[SEAL]

Attest:

Attesting Officer

GERALD J. MOSSINGHOFF

Commissioner of Patents and Trademarks